United States Patent [19]

Oikawa

[11] Patent Number: 5,457,483
[45] Date of Patent: Oct. 10, 1995

[54] PAGE PRINTER HAVING A PRINTING DRUM ROTATING AT PREDETERIMED SPEEDS AND A METHOD FOR DETERMINING THE SPEED

[75] Inventor: Masashi Oikawa, Tokyo, Japan

[73] Assignee: Oki Electric Industrial Co., Ltd., Tokyo, Japan

[21] Appl. No.: 862,557

[22] PCT Filed: Oct. 28, 1991

[86] PCT No.: PCT/JP91/01466

§ 371 Date: Jun. 22, 1992

§ 102(e) Date: Jun. 22, 1992

[87] PCT Pub. No.: WO92/07720

PCT Pub. Date: May 14, 1992

[30] Foreign Application Priority Data

Oct. 29, 1990 [JP] Japan .................................. 2-288387

[51] Int. Cl.⁶ .............................. H04N 1/21; B41J 2/435
[52] U.S. Cl. .......................... 347/129; 358/296; 347/139
[58] Field of Search ................................ 346/108, 107 R, 346/1.1, 76 L, 160; 358/296; 395/110

[56] References Cited

U.S. PATENT DOCUMENTS 3,971,044 7/1976 Findley et al. ............................. 354/9
3,999,168 12/1976 Findley et al. ........................... 395/110
5,086,309 2/1992 Iida et al. ................................. 346/160

FOREIGN PATENT DOCUMENTS

0317241 10/1989 European Pat. Off. .
59-177643 10/1984 Japan .
62-264371 11/1987 Japan .

*Primary Examiner*—Mark J. Reinhart
*Attorney, Agent, or Firm*—Panitch Schwarze Jacobs & Nadel

[57] ABSTRACT

Print data constructed of character data and so forth is developed into image data made of a dot matrix by a developing portion. Each band of the image data is stored in a raster buffer RAM. Each band of the image data is output and thereby an electrostatic latent image is formed on the printing drum. The developing portion provides data equivalent to a developing time for each band in advance. The developing time of each band is stored in a band management memory. A maximum developing time is obtained in accordance with the data stored in the band management memory. A rotating speed of the printing drum is obtained in accordance with the maximum time. The rotating time of the printing drum is optimized. Thus, the laser printer can prevent print data from being lost on a paper.

4 Claims, 11 Drawing Sheets

FIG. 5A a — 8 DOTS — 7 DOTS — 1 BYTE

FIG 5B

PERIOD — 3 DOTS — 3 DOTS — 1 BYTE

FIG. 5C

W — 11 DOTS — 9 DOTS — 1 BYTE — 1 BYTE

PAGE PRINTER HAVING A PRINTING DRUM ROTATING AT PREDETERIMED SPEEDS AND A METHOD FOR DETERMINING THE SPEED

TECHNICAL FIELD

The present invention relates to a page printer.

RELATED ART

Page printers are printers which sequentially receive print data from a workstation, a personal computer, or the like and print a page of received data at a time. In this description, an electrophotographic printer is exemplified as a related art The electrophotographic printer comprises a printer controller, an engine controller, and an engine.

The printer controller is connected to an information outputting portion such as a workstation or a personal computer. The printer controller receives print data from the information outputting portion and develops the print data into image data which can be printed by the engine. In the developing process, when information to be printed is data, print data consisting of character code data, control data, and so forth is converted into image data represented with an image matrix constructed of dots of a predetermined resolution. Since the developing process deals with data which is decomposed into dots of picture elements, this process requires a much longer time than the process which deals with code data.

The engine controller controls the engine in accordance with image data developed by the controller.

The engine prints on a paper the image data received from the engine controller.

Figure 8:
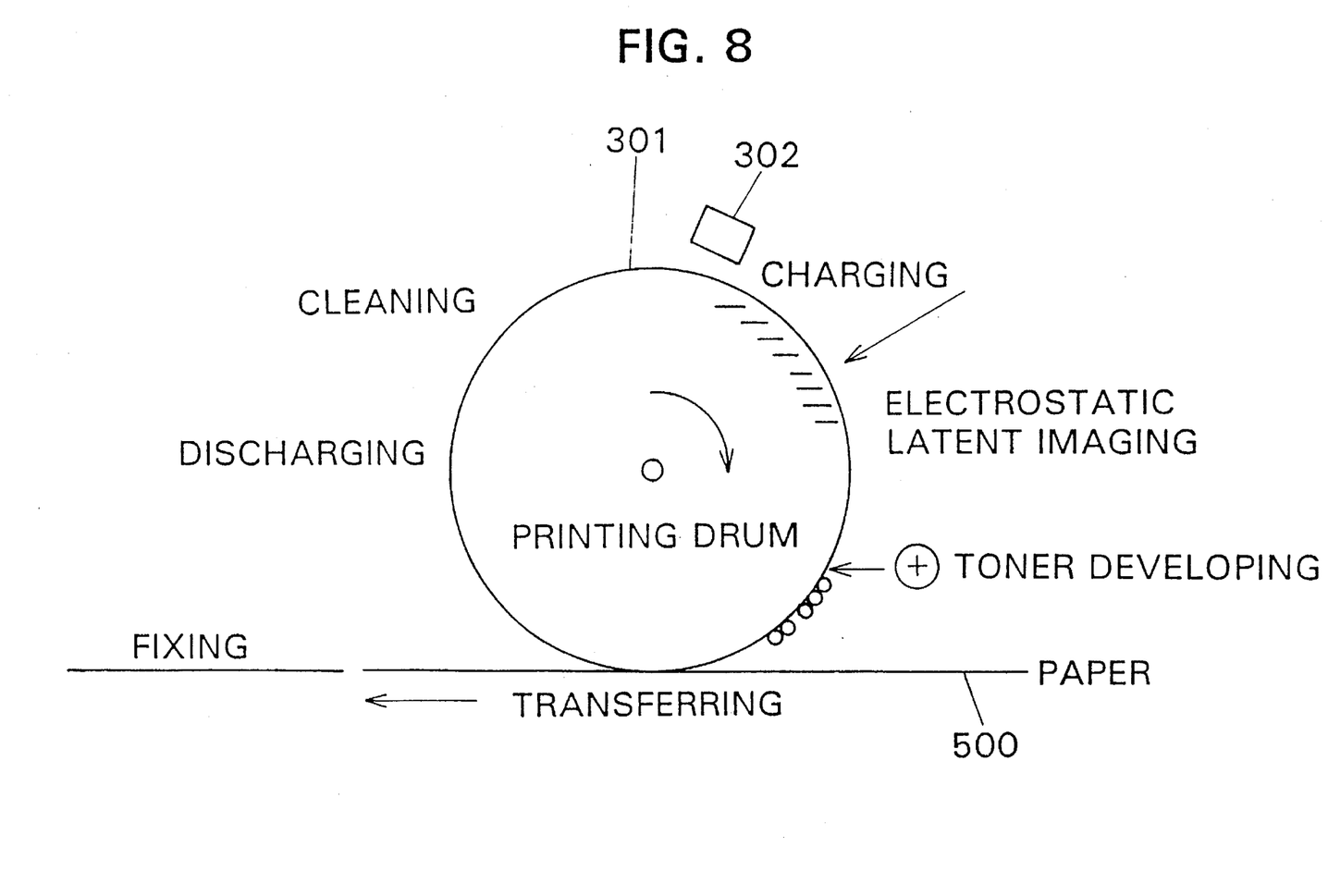
FIG. 8 is a schematic diagram showing the printing theory of an engine for use in a conventional printer.

In accordance with the light emitting techniques, the engine can be categorized as a laser type, an LED type, a liquid-crystal shutter type, a plasma display type, and so forth. In accordance with each technique, image data is printed in accordance with the printing theory as shown in FIG. 8.

In the figure, the engine has a printing drum 301. When image data is printed on a paper 500, a charger 302 of the engine charges the surface of the printing drum 301. By sequentially emitting light of image data on the surface of the printing drum 301, the surface of the printing drum 301 is photosensitized and an electrostatic latent image is formed. The electrostatic latent image formed on the printing drum 301 is developed by a toner. The developed image is transferred to the paper 500 and then fixed.

When the printer controller receives a form feed signal representing the end of a print page from the information outputting portion, the printer controller sends a control signal to a motor of the printing drum 301 through the engine controller. When the motor receives the control signal, the motor rotates the printing drum 301 at a constant speed, thereby feeding the paper 500 at a constant speed. A light emitting device in accordance with one of the above mentioned techniques successively receives image data and lights every row of a picture element matrix of the image data.

The accurate printing of print data received from the information outputting portion depends on whether or not the electrostatic latent image formed on the charged printing drum 301 is accurately shaped. The electrostatic latent image which is formed on the printing drum 301 is computed by using both the speed at which optical data of every row of a picture element matrix of image data to be printed is irradiated to the printing drum 301 and the rotating speed thereof. Thus, the transmission speed of the image data to the light emitting device and the rotating speed of the printing drum 301 are controlled so that they are synchronized each other.

The rotating speed of the rotating drum 301 is set in accordance with the processing capacity of a processor for the printer controller, that of the engine, the cost of the final product, and so forth along with the considerations of the situations and conditions of the applications thereof.

In the page printer according to band buffer technique, the rotating speed of the printing drum 301 cannot be easily determined.

Then, the band buffer technique will be described.

To store one page (in JIS A4 size) of image data with a resolution of 300 DPI (Dot Per Inch) to a raster buffer RAM 109, since this image data is constructed of 2338× 3407 picture elements (in the U.S. letter size, 2400×3200 picture elements), a memory which can store bits equivalent to this data amount is required. As the paper size increases, the number of bits necessary for the memory proportionally increases. To decrease the storage capacity of the memory and thereby provide an inexpensive and small page printer, it is necessary to reduce the storage capacity of this memory. One technique for solving such a problem is the band buffer technique.

In the band buffer technique, the following process is performed. A page corresponding to a print image is divided into bands in the X direction thereof. Print data is grouped into bands. Each band is edited and stored in a page buffer. In the developing process, each band is read from the page buffer and the band is developed into image data by a developing portion. The developed image data of each band is stored in an image data memory. In the printing process, image data is successively read from the image data memory and then sent to the engine through the engine controller.

In other words, when the image data memory provided in the printer controller is a raster buffer which stores image data of one page divided into a plurality of bands in the above mentioned manner, the raster buffer cyclically writes image data, sends the image data to the engine, and erases the image data. When print data sent from the information outputting portion to the printer controller contains lines successively composed of small letters and figures or a line complicatedly composed thereof, a large amount of data is concentrated to a single band. Thus, the controller takes a long time to develop this band of print data into image data (proportional to the data amount). When the data amount exceeds a predetermined level, the printing drum is rotated before the developing process of this band is complete. This situation is referred to as overrun. In this case, part of letters and figures is lost from image data and thereby the image data cannot be printed on the paper.

DISCLOSURE OF THE INVENTION

A page printer is disclosed, wherein print data consisting of character data and so forth is developed into image data composed of a dot matrix or the like by a developing portion. Bands of the developed image data are successively stored in a raster buffer RAM one after the other. Each band is successively output and an electrostatic latent image is formed on a printing drum. The developing portion has created data equivalent to a developing time of each band.

The data of developing time for each band is stored in a band management memory. By means of the data stored in the band management memory, the maximum time necessary for developing the bands is computed. The rotating speed of the printing drum is computed in accordance with the maximum time, thereby optimizing the rotating time of the printing drum.

As a result, the page printer can prevent letters and figures from being lost on a paper and provide as a high speed as possible.

MODE FOR CARRYING OUT THE INVENTION

Then, with reference to the accompanying drawings, an embodiment in accordance with the present invention will be described.

Figure 1:
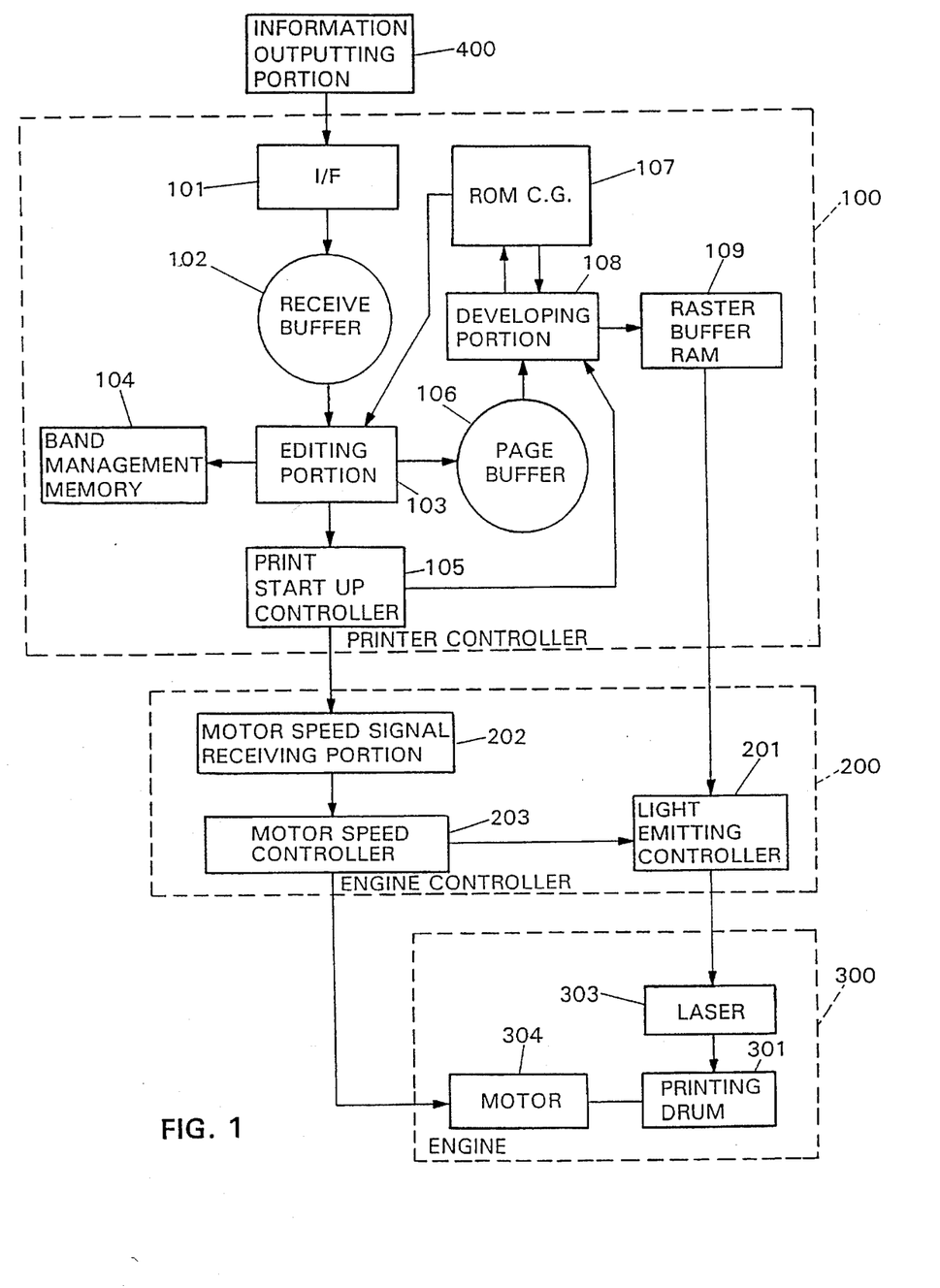
FIG. 1 is a block diagram describing an embodiment of a page printer in accordance with the present invention.

FIG. 1 is a block diagram describing an embodiment of the present invention. In this embodiment, a laser printer having a resolution of 300 DPI both in the main scanning direction and the sub scanning direction and printing data on cut sheet papers in A4 size is exemplified. The direction in which the paper moves is referred to as the Y direction, while the direction perpendicular to the Y direction is referred to as the X direction.

In the figure, the laser printer comprises a printer controller 100, an engine controller 200, and an engine 300. The printer controller 100 is connected to an information outputting portion 400 such as a workstation or a personal computer.

The printer controller 100 comprises an interface 101 for receiving print data from the information outputting portion 400; a receive buffer 102 for storing print data received from the interface 101; an editing portion 103 for editing the print content of one page in accordance with print data received from the receive buffer 102; a band management memory 104 for storing a predetermined value for each band where print data is developed and stored; a print start up controller 105 for sending a control signal to the engine controller 200 in accordance with an output of the editing portion 103 and an output of the band management memory 104; a page buffer 106 for storing print data of one page edited by the editing portion 103; a character generator ROM 107 for storing a character font in accordance with each character font and for sending attribute data of each character font to the editing portion 103; a developing portion 108 for successively reading print data from the page buffer 106 and for developing print data into image data by using fonts stored in the character generator ROM 107; and a raster buffer RAM 109 for storing image data developed by the developing portion 108. The printer controller 100 causes the page buffer 106 to edit and store print data and manage bands in accordance with the band buffer technique. In addition, the printer controller 100 causes the raster buffer RAM 109 to develop image data.

The interface 101 is an input circuit for electrically connecting the information outputting portion 400 and the page printer.

The receive buffer 102 is a memory for temporarily storing print data received from the interface 101. The receive buffer 102 adjusts the difference between the input speed of the print data received from the information outputting portion 400 and the process speed of the print data processed by the editing portion 103.

The editing portion 103 edits print data of one page in accordance with information as print data such as character codes, print positions, control commands (carriage return representing the end of a line, form feed representing the end of a page), and so forth received from the receive buffer 102 and stores the edited data in the page buffer 106. The end of a page can be identified with the form feed command or the like. The editing portion 103 obtains the area of each character in accordance with an attribute value of each character font stored in the character generator ROM 107. Thereafter, the editing portion 103 multiplies this area by the process speed of the processor which performs the develop process, thereby obtaining a developing time. This developing time is stored in the band management memory 104 as band management data.

Figure 2:
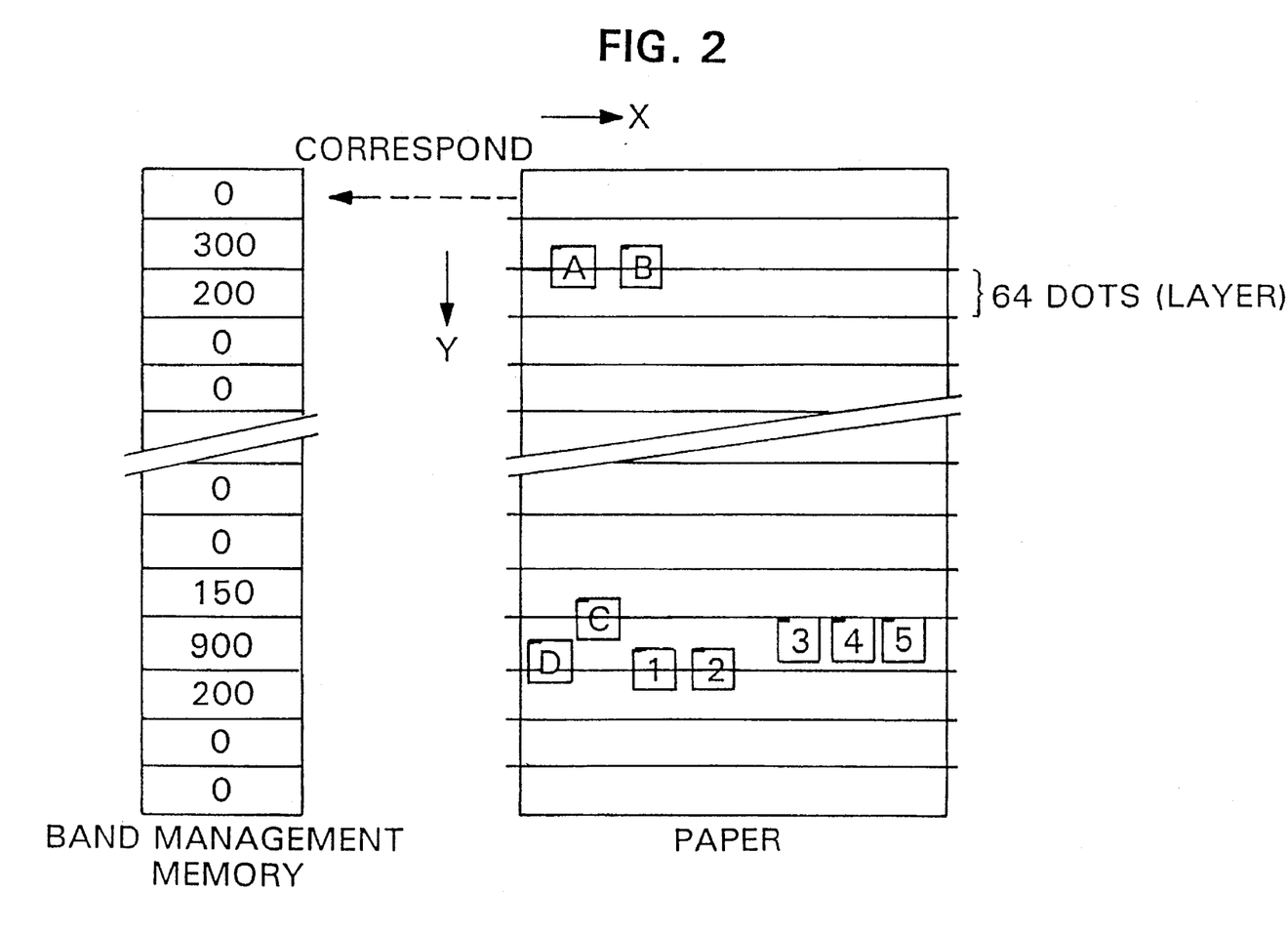
FIG. 2 is a bands—band management memory comparative schematic diagram describing the band management memory in accordance with the present invention.

As shown in FIG. 2, the band management memory 104 is a memory table where the Y direction of one page of virtual image data developed by the developing portion 108 precisely accords with bands, each of which consists of 64 dots (1 dot equals to 1/300 inches). In each band of the memory table, the above mentioned band management data is stored. As shown in the figure, the band position of each character is computed by dividing the Y coordinate value of the print position disposed at the uppermost, leftmost position of the character cell by 64.

The print start up controller 105 receives a signal representing that the editing portion 103 has detected a form feed command and sends a print start signal to the engine controller 200. In addition, the print start up controller 105 sends a development start signal to the developing portion 108.

The page buffer 106 is a memory for storing one page of character codes and information with respect to types, sizes, and positions thereof.

The character generator ROM 107 is a ROM for storing each character font and each attribute thereof in accordance with each character code which constructs print data. Character fonts are categorized as font types and font sizes. The attribute value of each character font contains the number of bits in the vertical direction, the number of bits in the horizontal direction, and a horizontal character pitch. The above mentioned character generator ROM 107 is referred to as a bit map type character generator. Instead of this bit map type character generator, it is possible to use an outline type character generator in such a way that it outputs the same output signals as the bit map type character generator does. In other words, the outline type character generator has a vector font data memory and a rasterizer. The rasterizer references the vector font data memory and composes a bit map type character font in a predetermined size. At the time, the rasterizer should output same attribute value as the bit map type character generator does. When the outline type character generator is used in the above mentioned construction, other circuits can be constructed in the same manner as the bit map type character generator.

The developing portion 108 performs the develop process by using print data, which is constructed of information of character codes, control commands (print position, carriage return representing the end of a line), and so forth received from the page buffer 106, and character fonts stored in the character generator ROM 107.

The raster buffer RAM 109 is a memory for storing image data constructed of groups of picture elements developed from print data by the developing portion 18 as bands (which will be described in more detail). Thus, the raster buffer RAM 109 does not require the number of bits equivalent to one page of print image. However, the more the bits, the more data can be developed at a time. It is preferable that the raster buffer ROM 109 has a plurality of bands, more preferably three or more bands.

Figure 3:
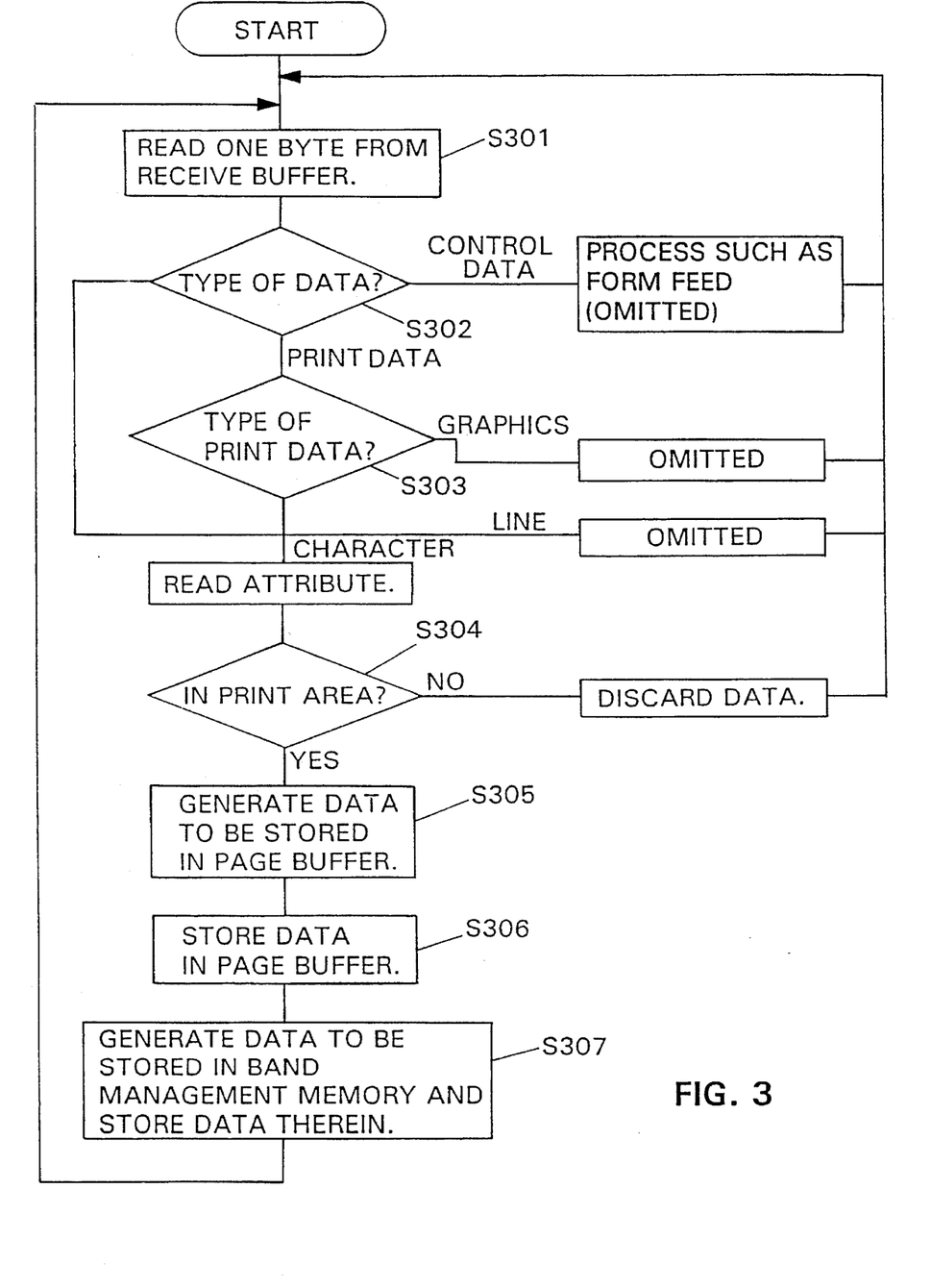
FIG. 3 is a flow chart describing a process of an editing portion in accordance with the present invention.

Next, a process of the editing portion 103 will be described with reference to a flow chart of FIG. 3.

The receive buffer 102 receives print data from the information outputting portion 400 through the interface 101.

The editing portion 103 reads one byte of print data from the receive buffer 102 (in S301).

The editing portion 103 determines whether or not the type of the print data being read is control data or print data (in S302). When the received data is control data such as a form feed, the editing portion 103 performs a corresponding process such as a form feed operation.

The editing portion 103 determines whether or not the print data being received is character data or graphic data or a line (in S303). When the determined result is graphic data or a line, the editing portion 103 performs a corresponding process.

When the print data being received is character data, the editing portion 103 reads its attribute and determines whether or not the character is in the print area (in S304). When the character is not in the print area, the editing portion 103 discards the print data.

The editing portion 103 converts the character data in the print area into data which can be stored in the page buffer 106 like the process for use in the conventional page printer and stores the character data therein (in S305 and S306).

Figure 4:
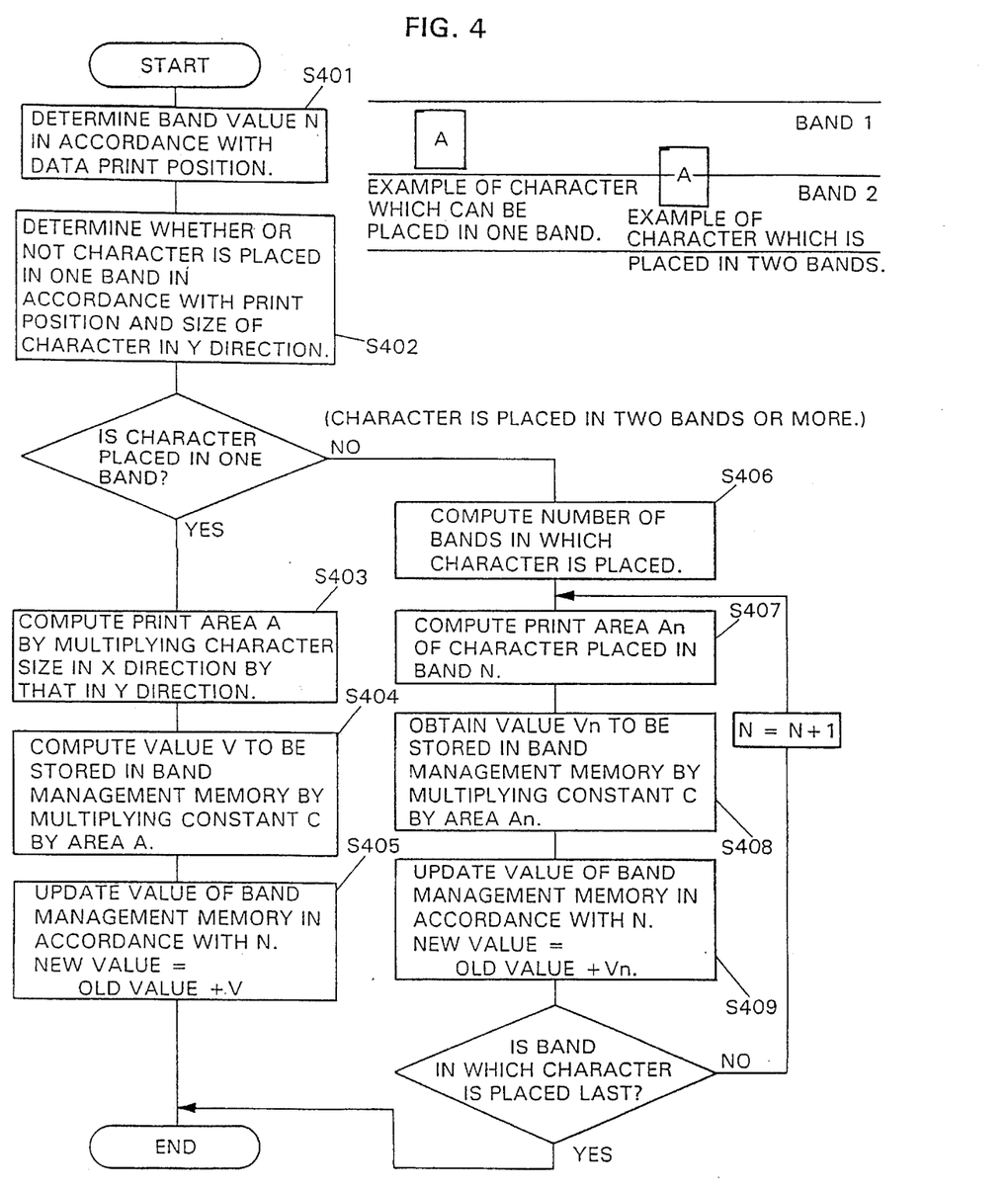
FIG. 4 is a flow chart describing a generation process of band management data in accordance with the present invention.

The editing portion 103 generates band management data in accordance with a process shown in FIG. 4 and stores the data in the band management memory 104 (in S306).

Then, with reference to FIG. 4, a process for generating band management data will be described.

First, a band value N in which character data is involved is obtained in accordance with a print position of the character data (the coordinates of the leftmost, uppermost position of the page). Assuming that the Y coordinate of the print position is YZ, since each band consists of 64 dots, the band value N is given by the following formula (in S401).

$N=YZ/64$

Then it is determined whether or not the character in process is in one band by using the print position YZ and the number of dots YD in the Y direction. The operation is performed by comparing N with the result of the following expression (in S402).

$(YZ+YD)/64$

When the character in process can be placed in one band, the flow advances to the first step on the left of the flow chart.

First, the number of bytes A equivalent to the print area is computed by multiplying the number of dots XC in the X direction by the number of dots YC in the Y direction (in S403). At this time, since the conventional processor processes a byte at a time, the number of dots in the X direction is divided by 8. When there is a remainder, the quotient is rounded up and the resultant value XB becomes the number of bytes to be used for computing the value A.

$A=XB \times YC$

Figure 5A:
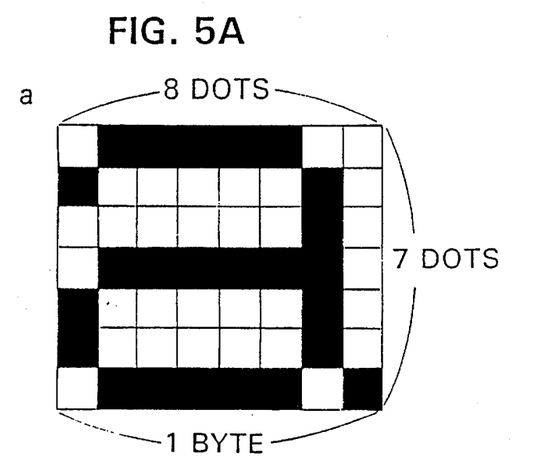
FIGS. 5A and 5D are schematic diagrams showing examples of bit map patterns of characters.
Figure 5B:
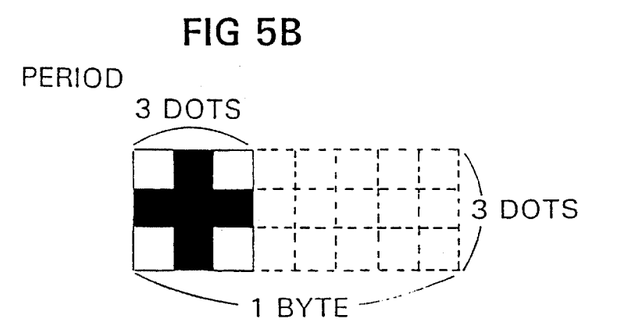
Figure 5C:
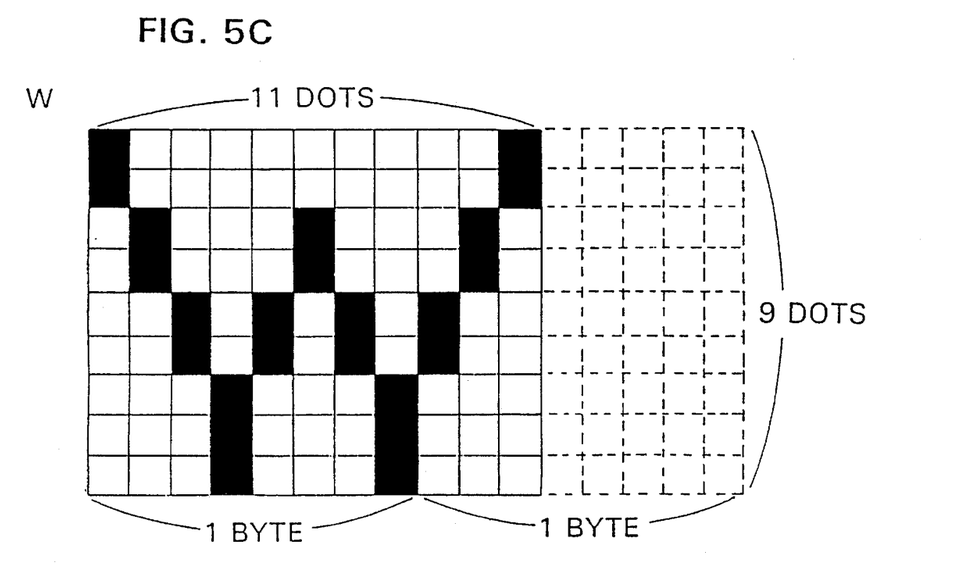

For example, as shown in FIGS. 5A–5C, assume that characters to be computed are "a", ".", and "W". When the character to be computed is "a", since XY=8 dots and YC=7 dots, thus A=1 byte×7 dots=7 bytes.

When the character to be computed is ".", since XC=3 dots and YC=3 dots, thus A=1 byte×3 dots=3 bytes When the character to be computed is "W", since XC=11 dots and YC=9 dots, thus A=2 bytes×9 dots=18 bytes.

Then, a constant C is read. Thereafter, the constant C is multiplied by the area A to obtain band management data V equivalent to a time necessary for developing the character in process (in S404).

$V=A \times C$ where the constant C is a value equivalent to a time necessary for the processor to perform a developing process for one byte. The value of the constant C depends on the type (character or graphics line) of print data because the process speed varies thereby.

Now, consider that the above mentioned characters are processed again and the value of the constant C is 30 (unit: microsec).

When the character to be computed is "a", 7 bytes×30 microsec=210 microsec.

When the character to be computed is ".", 3 bytes×30 microsec=90 microsec.

When the character to be computed is "W", 18 bytes×30 microsec=540 microsec.

Next, the band management data being computed is added to the value of the band management memory 104 of this band. Thereafter, the time necessary for development of this band is cumulated and updated (in S405).

When the character in process is placed in a plurality of bands, the flow enters the first step on the right of the flow chart.

First, the number of bands in which the character is placed is computed (in S406).

Next, the number of bytes An equivalent to the print area of the first band is computed (in S407). This process is the same as that in S403 except that the print area of the first number of bytes is computed.

Figure 5D:
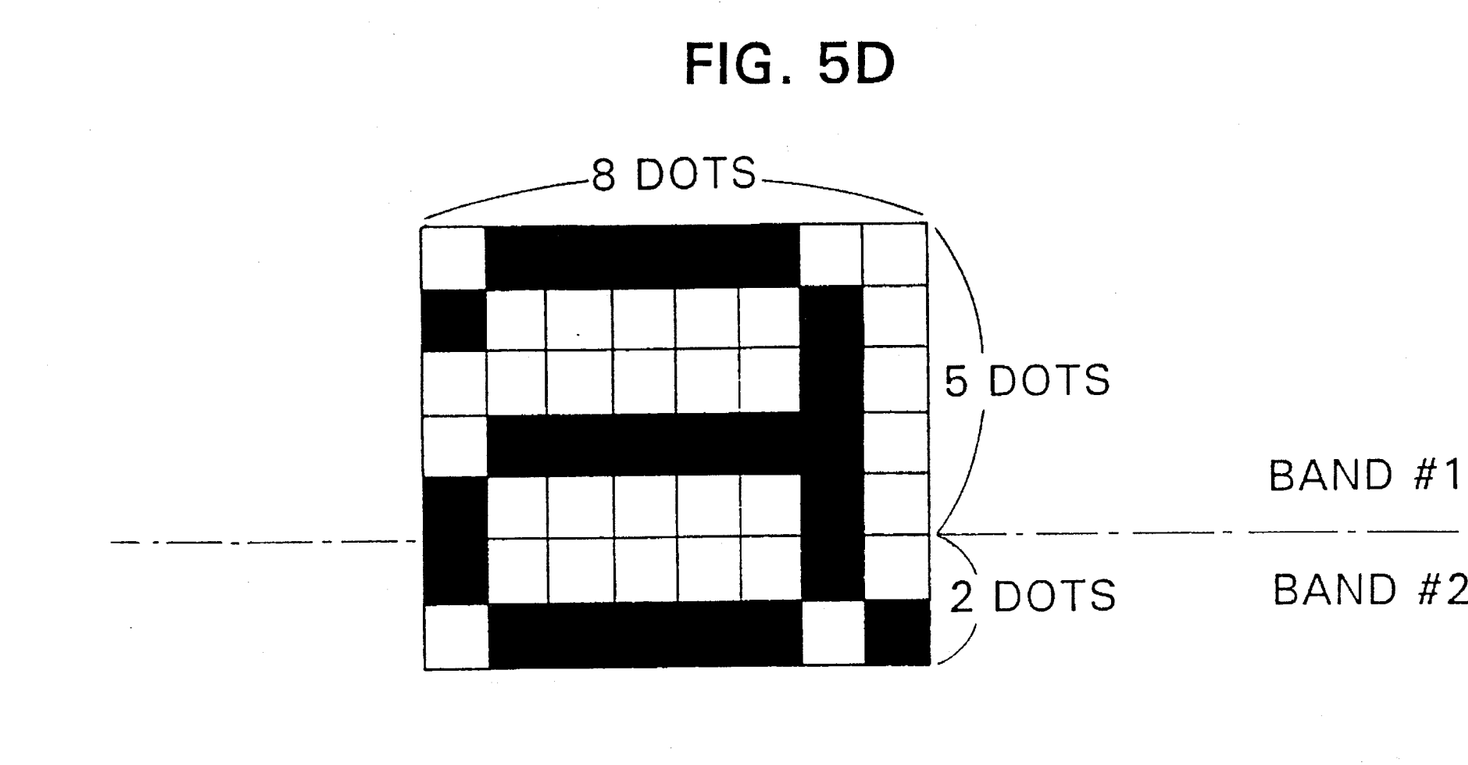

As shown in FIG. 5D, assume that the character "a" is placed in two bands.

In the first band, A=1 byte×5 dots=5 bytes.
In the next band, A=1 byte×2 dots=2 bytes.

Next, band management data Vn equivalent to a time necessary for development of the first band of the character in process is computed in the same manner as S404 (in S408).

Then, the value of the band management data of the band in process is updated in the same manner as S405 (in S409).

By repeating the above mentioned steps for the number of bands in which the character is placed, the band management data of the plural bands is obtained.

Thereafter, the steps from START to END are repeated until all print data of one page is processed.

The above mentioned process was with respect to character codes consisting of characters. In the page printer where a line is developed into a horizontally wide character and a vertically long character, the line can be computed as a vertical character and a horizontal character. Likewise, with respect to image data being read by an image scanner and so forth, its band management data is computed in accordance with the development technique of print data of the developing portion.

Figure 6:
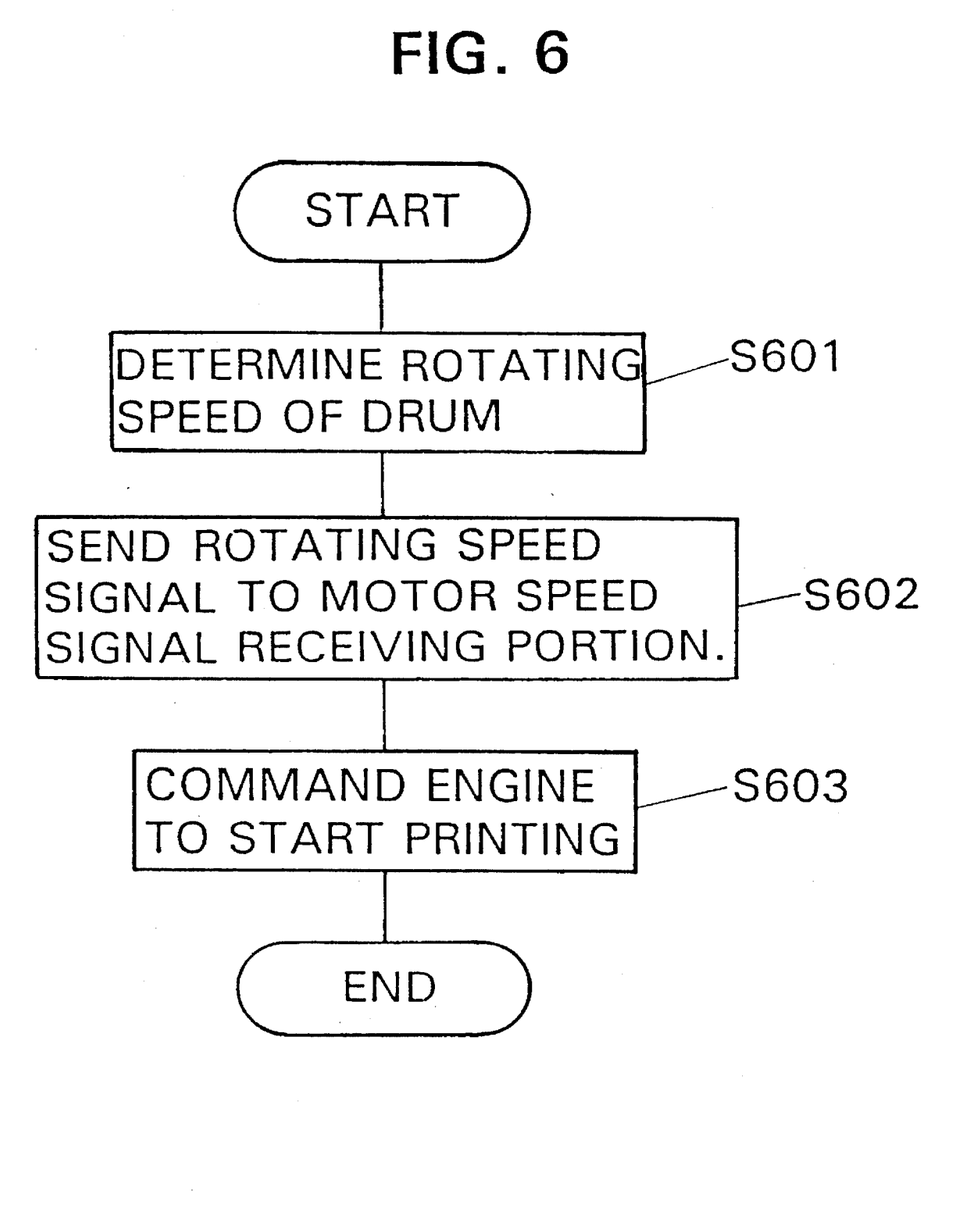
FIG. 6 is a flow chart describing a process of print start up operation in accordance with the present invention.

When the editing portion 103 has completely edited one page of print data, as shown in FIG. 6, the print start up controller 105 computes a rotating speed of the printing drum 301 (in S601) and sends a motor speed signal to the motor speed signal receiving portion 202 (in S602). The motor speed controller 203 rotates the motor 304 in accordance with the motor speed signal received through the motor speed signal receiving portion 202.

Figure 7:
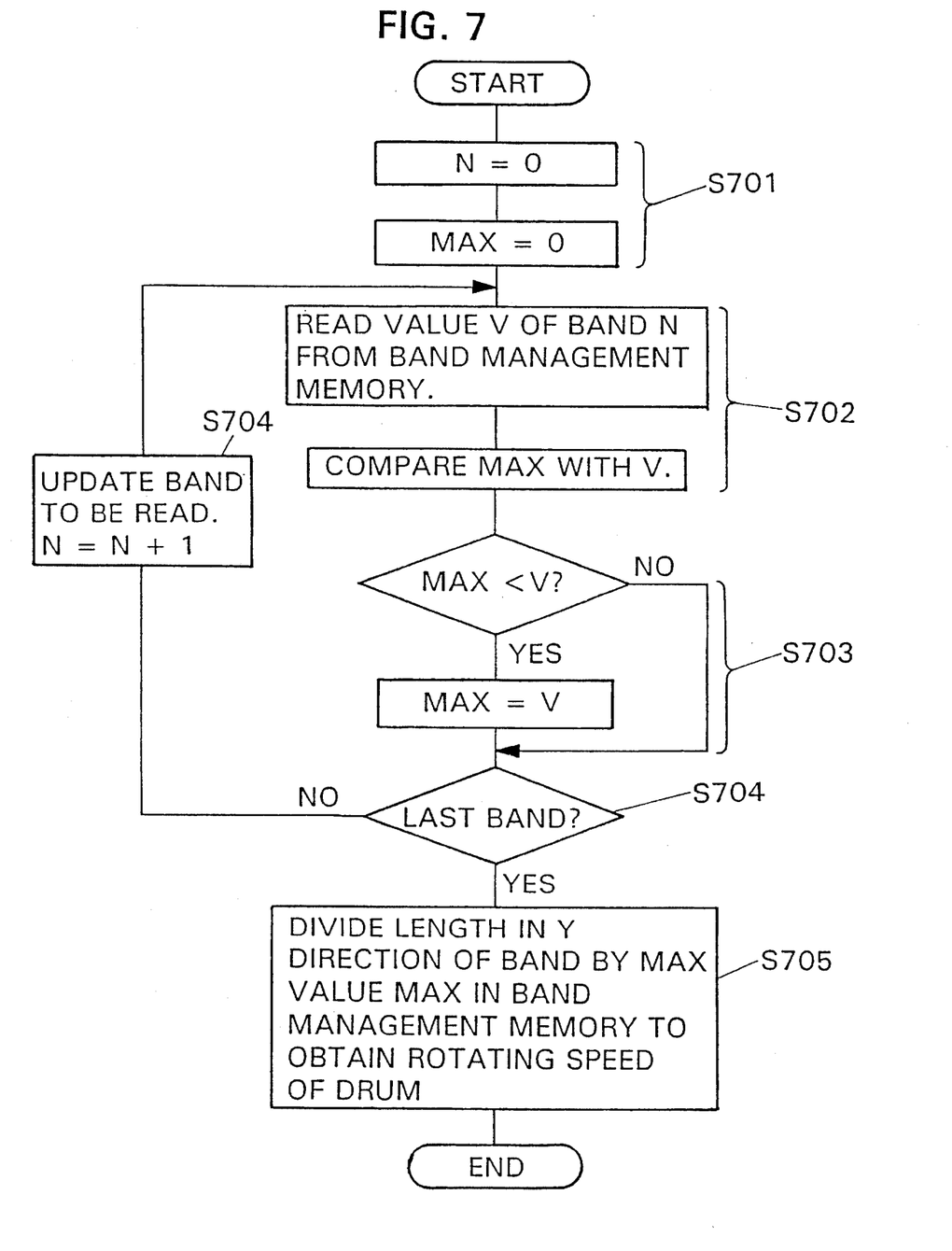
FIG. 7 is a flow chart describing a process of computing a rotating speed of a printing drum in accordance with the present invention.

The rotating speed of the printing drum 301 is computed by the print start up controller 105 in accordance with a process shown in FIG. 7.

First, the band variable N and the maximum developing time variable MAX which are stored in the band management memory 104 are initialized (in S701).

Then, the band management data V of the band N is read. Thereafter, the band management data V is compared with the maximum developing time variable MAX which is stored (in S702).

When the band management data V of the band N is larger than the maximum developing time variable MAX, the band management data V is written to the maximum developing time variable MAX. Otherwise, the maximum developing time variable MAX is not changed (in S703).

These steps are repeated for each band to be read (in S704). Thus, the maximum developing time of the band in process of the page is obtained.

Then, by dividing the length in the Y direction of the band in process by the maximum developing time variable MAX, the rotating speed of the printing drum 301 is obtained (in S705).

For example, when the printing drum 301 has a rotating speed of 2 inches/sec and a resolution of 300 DPI, the printing time of one band is:

64 dots/(2 inches/sec×300 DPI)=.107 sec= ,000 microsec

Thus, when the maximum developing time variable MAX exceeds 107,000 microsec, the speed of the printing drum 301 should be decreased. When the maximum developing time variable MAX is 150,000 microsec rather than 107,000 microsec, the rotating speed of the printing drum 301 is:

64 dots/(.15 sec×300 DPI)=.42 inches/sec

In this manner, the rotating speed of the printing drum 301 can be obtained.

Then, a construction of the engine controller 200 is described. The engine controller 200 shown in FIG. 1 comprises a light emitting controller 201 for receiving a line (in X direction) of image data stored in the raster buffer RAM 109 at a time and for controlling the light emission of a laser 303; a motor speed signal receiving portion 202 for receiving a control signal from the print start up controller 105; and a motor speed controller 203 for controlling the number of rotations of the motor 304 of the engine 300 in accordance with a print start up signal received through the motor speed signal receiving portion 202 and for sending a control signal to the light emitting controller 201.

The engine 300 comprises the printing drum 301; the laser 303 for irradiating scanning light to the X direction of the printing drum 301 under control of the light emitting controller 201; and the motor 304 for rotating the printing drum 301. In this embodiment, as an example of the light emit device, the laser 303 is used. However, when the LED technique, the liquid crystal shutter technique, or the plasma display technique is employed instead of the laser technique, an LED array, a combination of a light source and a liquid crystal shutter, or a plasma display panel can be used respectively In each case, the light emitting controller 201 should accord with the corresponding light emitting device.

When data is printed by using the page printer in the above mentioned construction, the printing drum 301 is rotated with the aforementioned motor speed signal at a predetermined speed. The light emitting controller 201 synchronizes the rotating speed of the printing drum 301 with the oscillation of the laser 303 in accordance with an output signal of the motor speed controller 203 and thereby forming an electrostatic latent image on the printing drum 301.

Figure 9:
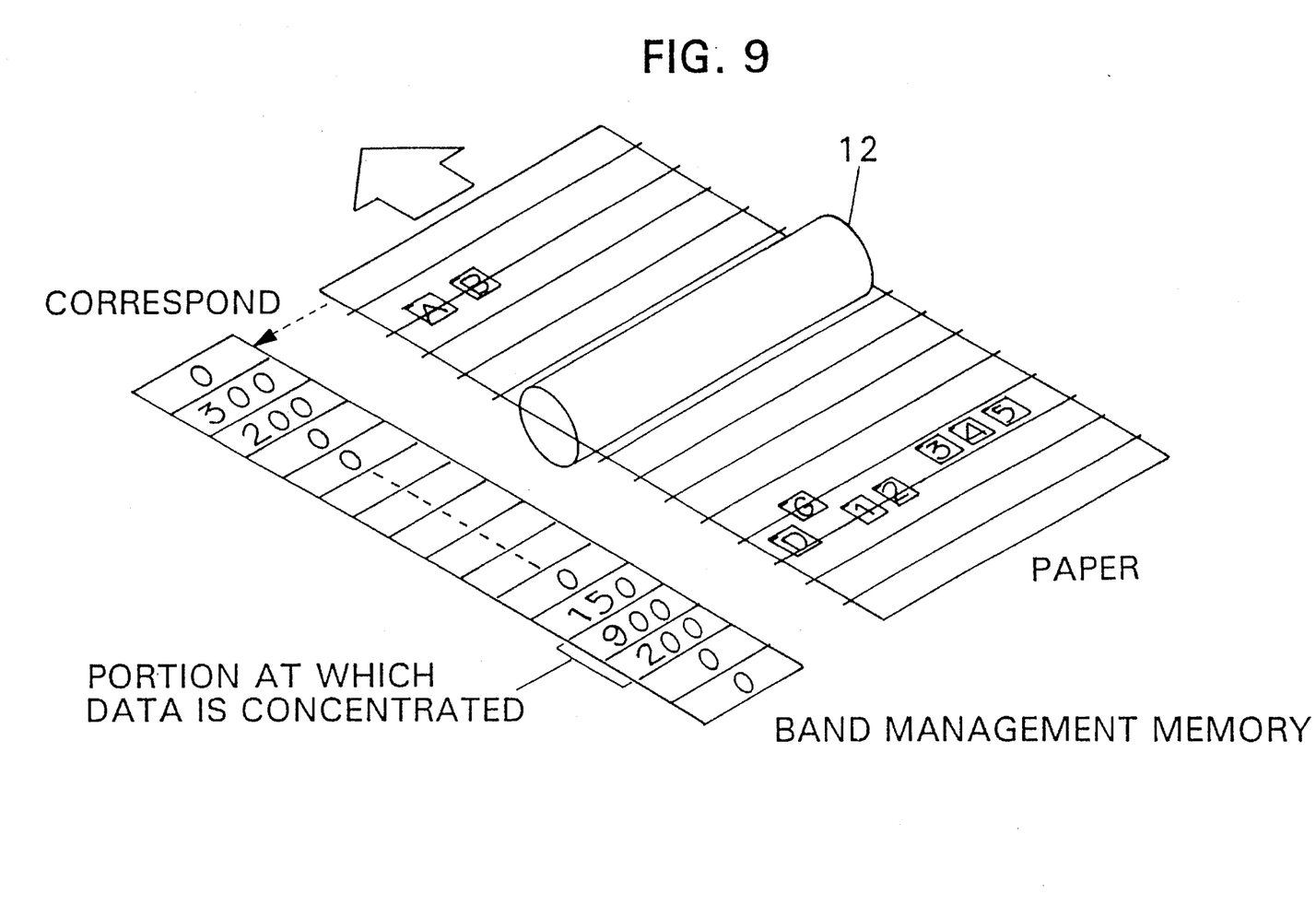
FIG. 9 is a bands—band management memory comparative schematic diagram describing a data concentrated portion of print data in accordance with the present invention.
Figure 10A:
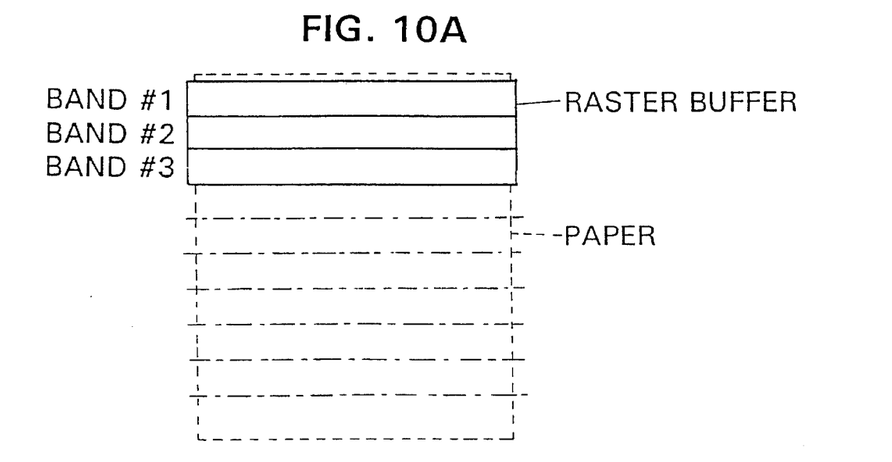
FIGS. 10A, 10B and 10C are timing charts describing differences in print operations between the page printer in accordance with the present invention and the conventional page printer.
Figure 10B:
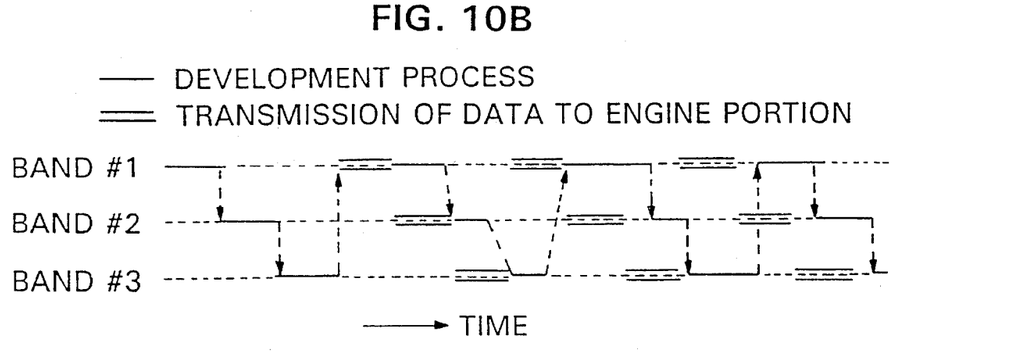
Figure 10C:
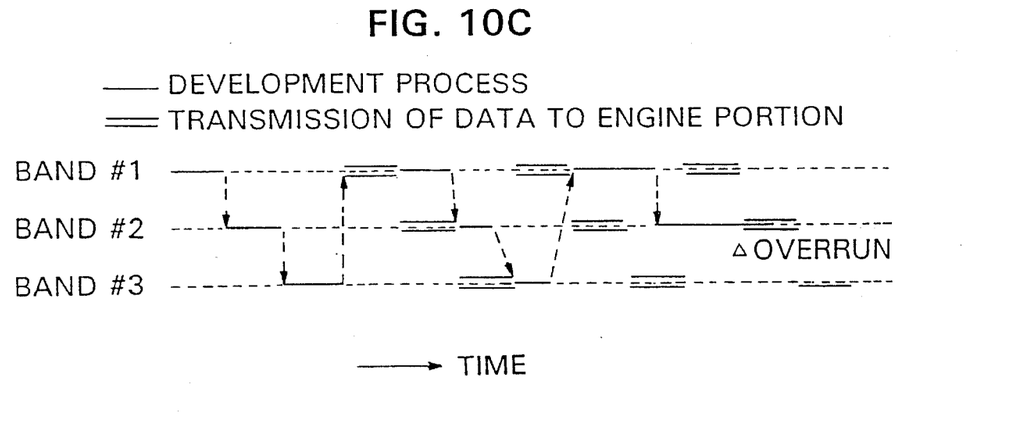

So far, when a raster buffer RAM having three bands as shown in FIG. 10 (a) was used, if data was concentrated at one of the bands as shown in FIG. 9, image data was sent to the engine 300 while print data was developed to image data. Thus, as shown in FIG. 10 (c), an overrun took place. However, according to the present invention, since the rotating speed of the printing drum 301 can be adjusted, as shown in FIG. 10 (b), no overrun takes place. In addition, since the printing drum 301 can be rotated at a maximum rotating speed free of occurrence of overrun, data can be quickly printed.

I claim:

1. A page printer for printing pages, each page having a sheet feed direction being the direction in which the page travels through the page printer, the page printer having a printing drum rotating at predetermined speeds and comprising:

a page buffer storing print data corresponding to at least one page, the print data comprising data characters;

developing means for converting print data stored in the page buffer into image data, the image data being in a dot matrix format;

a raster buffer RAM for storing the image data from the developing means in a plurality of bands, each band corresponding to a portion of a page taken in the sheet feed direction;

means for computing the time taken by the developing means to convert print data to image data for each band;

a band management memory for storing data for each band corresponding to the computed converting time for the band, the band management memory having sufficient capacity to store data for bands corresponding to the image data of at least one page;

means for detecting the end of a page of print data stored in the page buffer and for performing page processing in response to the detection of the end of a page; and a print start up controller for computing a rotating speed of said printing drum for each band, the predetermined rotating speed for each band corresponding to the computed converting time stored in the band management memory for each band.

2. In a page printer for printing pages, each page having a sheet feed direction being the direction in which the page travels through the page printer, the page printer having a printing drum rotating at predetermined speeds, a method for determining the speed comprising:

receiving print data from a data processing apparatus, the print data comprising data characters;

converting the print data stored in the page buffer into image data, the image data being in a dot matrix format;

storing the image data in a plurality of bands, each band corresponding to a portion of a page taken in the sheet feed direction;

computing the time taken to convert print data to image data for each band;

storing data for each band corresponding to the computed converting time for the band;

reading the data corresponding to the computed converting time; and determining a rotating speed of said printing drum for each band corresponding to the computed converting time for each band.

3. The method of claim 2 wherein the computing step comprises computing the time taken to convert print data to image data for each band according to the area occupied by each data character in the band.

4. The method of claim 3 wherein each data character has a print position on the page, wherein each page has a raster direction generally perpendicular with respect to the sheet feed direction, and wherein for each data character the computing step comprises the steps of:

determining the bands within which the data character resides, the determination based upon the print position of the character and the size of the character in the sheet feed direction;

computing for each band within which the data character resides, a value corresponding to the area occupied by the data character within the band, the computation based upon the size of the data character in the band in the sheet feed and raster directions; and adding the value for each band corresponding to the area occupied by the data character within the band to the band management memory corresponding to the band.

* * * * *